(12) United States Patent
Ramsey

(10) Patent No.: US 11,770,042 B2
(45) Date of Patent: Sep. 26, 2023

(54) BAFFLE WITH INTEGRATED COOLING FOR HYBRID DRIVE

(71) Applicant: Schaeffler Technologies AG & Co. KG, Herzogenaurach (DE)

(72) Inventor: John Ramsey, Mansfield, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 198 days.

(21) Appl. No.: 17/142,549

(22) Filed: Jan. 6, 2021

(65) Prior Publication Data
US 2022/0216764 A1  Jul. 7, 2022

(51) Int. Cl.
*H02K 5/20* (2006.01)
*H02K 9/193* (2006.01)

(52) U.S. Cl.
CPC ............ *H02K 5/203* (2021.01); *H02K 9/193* (2013.01)

(58) Field of Classification Search
CPC .......... H02K 5/203; H02K 9/193; H02K 9/19; H02K 9/00; H02K 7/108; H02K 7/006; H02K 5/20
See application file for complete search history.

(56) References Cited

U.S. PATENT DOCUMENTS

| | | | |
|---|---|---|---|
| 7,307,363 B2 * | 12/2007 | Pashnik | B60L 50/16 310/52 |
| 8,653,704 B2 * | 2/2014 | Atarashi | H02K 7/006 310/58 |
| 9,041,260 B2 * | 5/2015 | Ramey | H02K 9/19 310/58 |
| 2015/0175154 A1 * | 6/2015 | Frait | F16H 57/12 903/902 |
| 2020/0248758 A1 | 8/2020 | Satyaseelan | |

FOREIGN PATENT DOCUMENTS

WO    WO-2018225878 A1 * 12/2018

OTHER PUBLICATIONS

English translation of WO-2018225878-A1 (Year: 2018).*

* cited by examiner

*Primary Examiner* — Tulsidas C Patel
*Assistant Examiner* — Joshua Kiel M Rodriguez
(74) *Attorney, Agent, or Firm* — Volpe Koenig

(57) ABSTRACT

A hybrid drive assembly is provided having a hybrid drive housing with an electric motor and a disconnect clutch therein. A transmission is connected to the hybrid drive housing and a torque converter is provided between the electric motor and the transmission. A baffle extends radially between the torque converter and the hybrid drive housing. The baffle includes a ring-shaped body that is affixed to the hybrid drive housing and extends completely around a transmission side periphery of the hybrid drive housing. A fluid pathway is located on or in the baffle, and orifices extend from the fluid pathway toward the electric motor. A fluid inlet port is connected to the fluid pathway, and a fluid connection is provided from a pressurized fluid source to the fluid inlet port. This allows fluid circulated by a pump within the transmission, to be sprayed on the electric motor for cooling.

17 Claims, 2 Drawing Sheets

BAFFLE WITH INTEGRATED COOLING FOR HYBRID DRIVE

TECHNICAL FIELD

The present disclosure relates to additional cooling for a hybrid drive module.

BACKGROUND

Power consumption by electric motors in hybrid drives generates heat. This is often dissipated by transmission fluid flows that act as a coolant, and fins may be provided to direct and/or interrupt the oil flow that can be on the hybrid drive module housing as well as a baffle sometimes used at an end of the module housing to separate wet and dry side components. However, depending on load requirements and the volume of air that passes over the hybrid drive module and the transmission, such as at idle speeds, insufficient cooling is provided. The excess heat can result in inefficient operation and/or damage to the motor windings.

A more efficient way of cooling the electric motor is required which does not expand or significantly change the current envelope for the hybrid drive module.

SUMMARY

The present disclosure provides a hybrid drive assembly having a hybrid drive housing with an electric motor and a disconnect clutch therein. A transmission is connected to the hybrid drive housing and a torque converter is provided between the electric motor and the transmission. A baffle extends radially between the torque converter and the hybrid drive housing. The baffle includes a ring-shaped body that is affixed to the hybrid drive housing and extends completely around a transmission side periphery of the hybrid drive housing. A fluid pathway is located on or in the baffle, and a plurality of orifices extend from the fluid pathway toward the electric motor. A fluid inlet port is connected to the fluid pathway. A fluid connection is provided from a pressurized fluid source to the fluid inlet port. This allows fluid, preferably transmission fluid circulated by a pump within the transmission, to be sprayed on the stator of the electric motor for cooling. The number and position of the orifices can be arranged to provide the desired coverage.

In one disclosed embodiment, the baffle includes an internal cavity in the ring-shaped body that forms the fluid pathway. The fluid pathway may extend at least about 120 degrees around the transmission side periphery of the hybrid drive housing, preferably in an upper region of the hybrid drive housing.

The baffle can be formed of a polymeric material and the internal cavity is preferably integrally formed in the baffle. The orifices are preferably arranged to spray fluid on stator windings of the electric motor.

In one arrangement, the baffle includes mounting tabs that are configured to be connected to mounting surfaces on the hybrid drive housing. The fluid inlet port can be located in one of the mounting tabs.

In another embodiment, the fluid pathway can be formed by a tube affixed to the baffle, and the orifices are formed in the tube. Here, the baffle can include clips that affix the tube to the baffle. The baffle can be formed of a polymeric material and the clips can be integrally formed on the baffle.

In one arrangement, the tube extends at least about 120 degrees around the transmission side periphery of the hybrid drive housing.

The tube can be Y-shaped, and the center leg of the Y-shape can include the fluid inlet port which is connected to the pressurized fluid source. Here again, the orifices are adapted to spray fluid on stator windings of the electric motor.

In either arrangement, a number and location of the orifices is selected based on a desired cooling area.

In another aspect, a baffle having integrated cooling channels for a hybrid drive assembly is provided and has a ring-shaped body that is adapted to be affixed to a hybrid drive housing and extend completely around a transmission side periphery of the hybrid drive housing. A fluid pathway is located on or in the baffle, and a plurality of orifices extend from the fluid pathway that are configured to be oriented toward an electric motor of the hybrid drive assembly. A fluid inlet port is connected to the fluid pathway.

In one embodiment, the baffle includes an internal cavity that forms the fluid pathway that extends at least about 120 degrees around the ring-shaped body. The baffle can be formed of a polymeric material and the internal cavity can be integrally formed in the baffle.

In another embodiment, the fluid pathway can be formed by a tube affixed to the ring-shaped body, and the orifices are formed in the tube. Here, the ring-shaped body can include clips that affix the tube to the baffle.

Additional embodiments described below and in the claims.

BRIEF DESCRIPTION OF THE DRAWINGS

The foregoing Summary and the following Detailed Description will be better understood when read in conjunction with the appended drawings, which illustrate a preferred embodiment of the disclosure. In the drawings.

DETAILED DESCRIPTION

Figure 1:
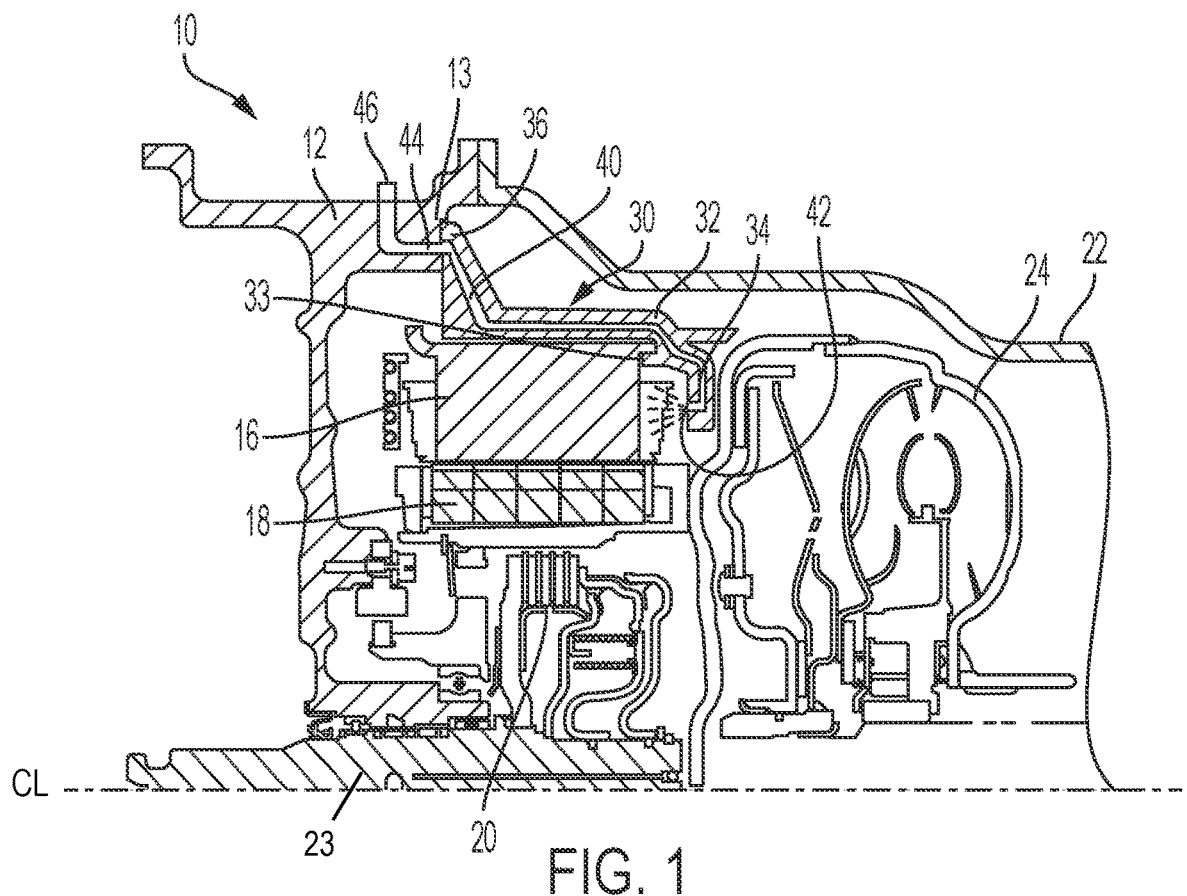
FIG. 1 is a cross-sectional view through a portion of a hybrid drive assembly for a motor vehicle, shown in half-section.

Certain terminology is used in the following description for convenience only and is not limiting. The words "front," "rear," "upper" and "lower" designate directions in the drawings to which reference is made. The words "inwardly" and "outwardly" refer to directions toward and away from the parts referenced in the drawings. "Axially" refers to a direction along the axis of a shaft. A reference to a list of items that are cited as "at least one of a, b, or c" (where a, b, and c represent the items being listed) means any single one of the items a, b, or c, or combinations thereof. This terminology includes the words specifically noted above, derivatives thereof and words of similar import. "Generally" or "approximately" refers to +/−10% of the indicated value.

The term e-machine is used generally herein to refer to an electric motor, such as a motor including a rotor, stator with windings, resolver, etc., used here in connection with a hybrid drive system.

Referring to FIG. 1, a hybrid drive assembly 10 is shown in a half cross-section. The hybrid drive assembly 10 is adapted to be connected to the output of an internal combustion engine and is located between the engine and the transmission. The hybrid drive assembly 10 includes a hybrid drive housing 12 with an electric motor 14 and a disconnect clutch 20 located therein. The electric motor 14 includes a stator 16 and a rotor 18, with the rotor 18 being detachably connectable via an input shaft 23 to a torque converter 24 via the disconnect clutch 20. In the drawings CL designates the centerline of the stator 16 and rotor 18. A transmission 22 is connected to the hybrid drive housing 12, with the torque converter 24 being located in the torque transmission path between the electric motor 14 and the transmission 22.

Figure 2:
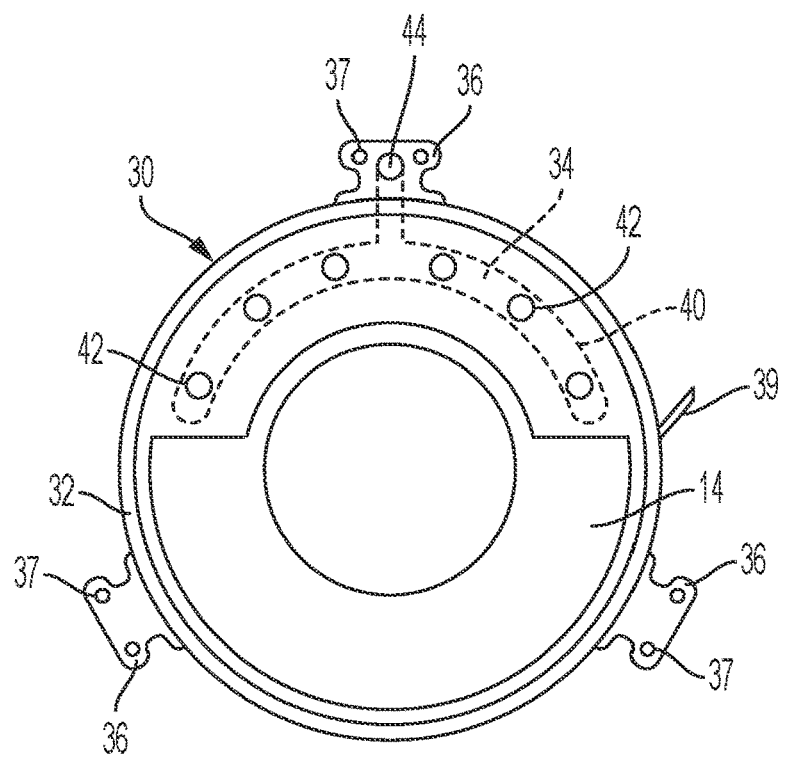
FIG. 2 is a front view of a baffle having a fluid pathway for cooling the electric motor of the hybrid drive assembly.

A baffle 30 extends radially between the torque converter 24 and the hybrid drive housing 12. The baffle 30 includes a ring-shaped body 32, best shown in FIG. 2, and is affixed to the hybrid drive housing 12, preferably via mounting tabs 36 that are configured to be connected to the mounting surfaces 13 on the hybrid drive housing 12. Hook-shaped engagement surfaces 33 can also be provided that engage with an edge of the electric motor 14, preferably with an edge of the stator 16. As shown in FIG. 2, preferably three of the mounting tabs 36 are provided; however, the number of tabs could be varied. Bolt holes 37 can be provided in the mounting tabs. Additionally, the number of mounting surfaces 13 required on the hybrid drive housing 12 is configured accordingly.

Still with reference to FIGS. 1 and 2, the ring-shaped body 32 extends completely around a transmission side periphery of the hybrid drive housing 12. This arrangement makes the baffle 30 more robust and streamlined, plus allows for more secure positioning. As shown in FIG. 2, one or more fins 39 can be provided in the baffle 30 that are used to help direct and/or interrupt a flow of fluid in the transmission.

Still with reference to FIGS. 1 and 2, a fluid pathway 40 is located on or in the baffle 30. A plurality of offices 42 extend from the fluid pathway 40 toward the electric motor 14. A fluid inlet port 44, preferably located in one of the mounting tabs 36, is connected to the fluid pathway 40. As shown in FIG. 1, a fluid connection from a pressurized fluid source 46 is provided to the fluid inlet port 44.

As shown in FIGS. 1 and 2, in this embodiment, the baffle 30 includes an internal cavity 34 in the ring-shaped body 32 that forms the fluid pathway 40. The fluid pathway 40 preferably extends at least about 120° around the transmission side periphery of the hybrid drive housing 12. However, it could extend a greater or lesser amount, for example between 90° and 180°, or could extend around the entire periphery.

The baffle 30 may be formed of a polymeric material and the internal cavity 34 can be integrally formed in the baffle 30. As shown in FIGS. 1 and 2, the orifices 42 are adapted to spray fluid on the electric motor 14, preferably on the stator 16. As gravity will carry the fluid downwardly, it is only necessary to have orifices in an upper portion of the baffle 30 for some applications, depending upon the cooling load that is being dissipated. The fluid is preferably transmission fluid that is circulated by a fluid pump in the transmission 22.

As shown in FIG. 2, the fluid inlet port 44 can be located in one of the mounting tabs 36. Seals can be provided, as would be understood by a person of ordinary skill in the art based on the present disclosure.

In order to provide sufficient cooling, the number and location of the orifices 42 can be selected in order to achieve a desired cooling area for the electric motor 14.

Figure 3:
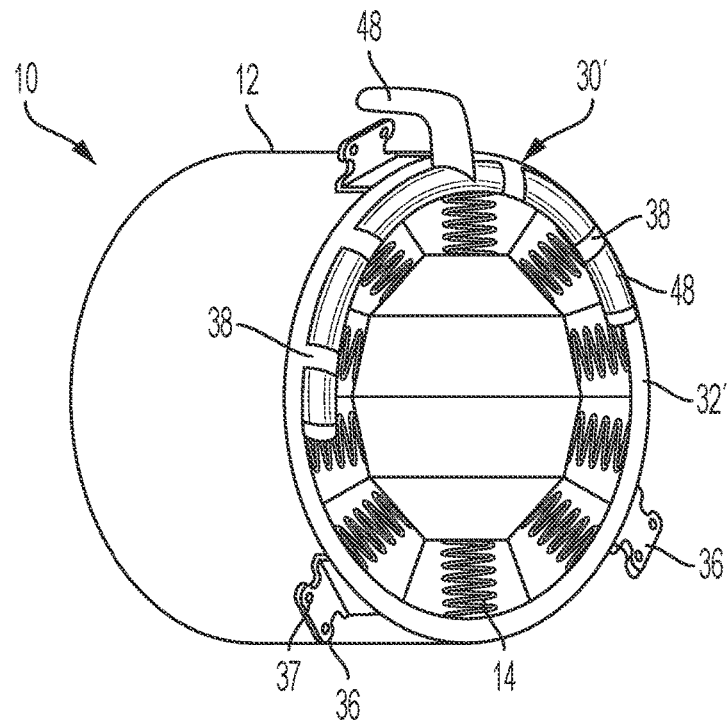
FIG. 3 is a perspective view of a second embodiment of a baffle connected around a transmission side periphery of a hybrid drive housing of a hybrid drive assembly for a motor vehicle.
Figure 4:
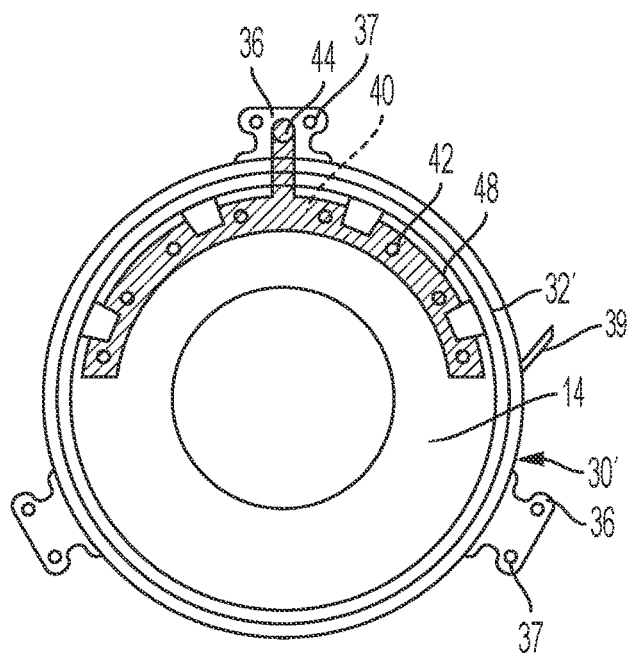
FIG. 4 is a front view of the baffle shown in FIG. 3.
Figure 5:
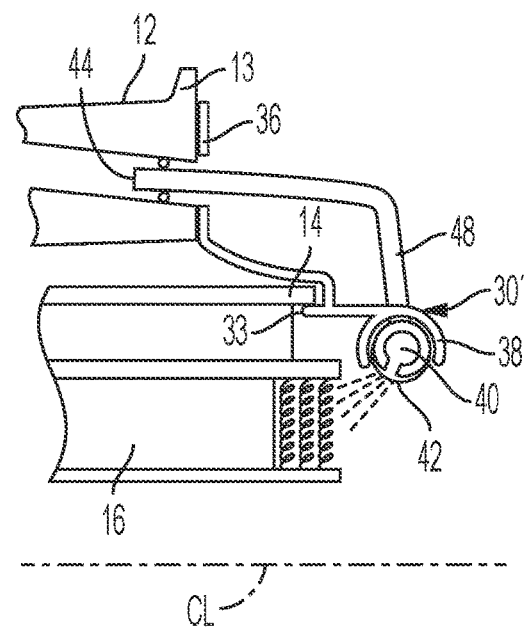
FIG. 5 is a cross-section view through the baffle shown in FIG. 4.

Referring now to FIGS. 3-5, an alternate embodiment of the baffle 30' is shown for use in connection with the hybrid drive assembly 10. The baffle 30' has a ring-shaped body 32' and is arranged in the same manner as the baffle 30; however, the fluid pathway 40 is formed by a tube 48 that is affixed to the baffle 30'. The orifices 42 are formed in the tube 48.

As shown in FIGS. 3-5, the baffle 30' includes clips 38 that affix the tube 48 to the baffle 30'. The baffle 30' may also be formed of a polymeric material and the clips 38 can be integrally formed on the baffle 30'. Alternatively, the clips 38 could be separately attached.

As shown in detail in FIGS. 3 and 4, the tube 48 is preferably Y-shaped, and the center leg of the Y-shape includes the fluid inlet port 44 which is connected to the pressurized fluid source 46. Here, an O-ring is used as a seal on the center leg of the tube 48.

While the tube 48 is only shown extending approximately 120° around the transmission side periphery of the hybrid drive housing 12, a person of ordinary skill in the art will recognize from the present disclosure that the tube could extend a greater or lesser amount around the periphery as noted above, depending upon the cooling load of the particular hybrid drive assembly 10.

The baffles 30, 30' with the fluid pathway 40 for cooling the hybrid drive assembly are preferably produced as separate parts and each includes a ring-shaped body 32, 32' that is adapted to be fixed to the hybrid drive housing 12 and extend completely around the transmission side periphery of the hybrid drive housing 12 in order to provide a more robust design with enhanced structural integrity. As discussed above, the fluid pathway 40 can either be provided integrally by an internal cavity 34 within the baffle 30 or via a separate tube 48 affixed to the baffle 30'. In either case, the baffle 30, 30' is preferably formed of a polymeric material and may include fins 39, one of which is indicated in FIG. 2, that may be used to direct a flow and/or interrupt undesired flow of oil in the transmission. This reduces losses in the system and ensures all the oil is making it back the sump.

Having thus described the present embodiments in detail, it is to be appreciated and will be apparent to those skilled in the art that many physical changes, only a few of which are exemplified in the detailed description of the disclosure, could be made without altering the inventive concepts and principles embodied therein.

It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the disclosure being indicated by the appended claims rather than by the foregoing description, and all alternate embodiments and changes to this embodiment which come within the meaning and range of equivalency of said claims are therefore to be embraced therein.

LOG OF REFERENCE NUMERALS 10 hybrid drive assembly
12 hybrid drive housing
13 mounting surfaces
14 electric motor 16 stator
18 rotor
20 disconnect clutch
22 transmission
24 torque converter
30, 30' baffle
32, 32' ring-shaped body
33 hook-shaped engagement
34 internal cavity
36 mounting tabs
37 bolt holes
38 clips
39 fin
40 fluid pathway
42 orifices
44 fluid inlet port
46 pressurized fluid source
48 tube

The invention claimed is:

1. A hybrid drive assembly, comprising:
a hybrid drive housing with an electric motor and a disconnect clutch therein, wherein the hybrid drive housing is configured to connect to a transmission;
a torque converter between the electric motor and the transmission;
a baffle extending radially between the torque converter and the hybrid drive housing, the baffle including a ring-shaped body that is affixed to the hybrid drive housing and extends completely around a transmission side periphery of the hybrid drive housing in an area enclosed between an outer housing of the transmission and the hybrid drive housing, the baffle further including mounting tabs that are configured to be connected to mounting surfaces on the hybrid drive housing;
a fluid pathway located on or in the baffle, a plurality of orifices extending from the fluid pathway toward the electric motor, and a fluid inlet port located in one of the mounting tabs and connected to the fluid pathway; and
a fluid connection from a pressurized fluid source to the fluid inlet port.

2. The assembly of claim 1, wherein the baffle includes an internal cavity in the ring-shaped body that forms the fluid pathway.

3. The assembly of claim 2, wherein the fluid pathway extends at least about 120 degrees around the transmission side periphery of the hybrid drive housing.

4. The assembly of claim 2, wherein the baffle is formed of a polymeric material and the internal cavity is integrally formed in the baffle.

5. The assembly of claim 1, wherein the orifices are directed axially toward a stator and adapted to spray fluid on the stator of the electric motor.

6. The assembly of claim 1, wherein the fluid pathway is formed by a tube affixed to the baffle, and the orifices are formed in the tube.

7. The assembly of claim 6, wherein the baffle includes clips that affix the tube to the baffle.

8. The assembly of claim 7, where in the baffle is formed of a polymeric material and the clips are integrally formed on the baffle.

9. The assembly of claim 6, wherein the tube extends at least about 120 degrees around the transmission side periphery of the hybrid drive housing.

10. The assembly of claim 6, wherein the tube is Y-shaped, and a center leg of the Y-shape includes the fluid inlet port which is connected to the pressurized fluid source.

11. The assembly of claim 6, wherein the orifices are adapted to spray fluid on a stator of the electric motor.

12. The assembly of claim 1, wherein a number and location of the orifices is selected based on a desired cooling area for a stator of the electric motor.

13. A baffle having integrated cooling channels for a hybrid drive assembly, the baffle comprising:
a ring-shaped body that is adapted to be affixed within a hybrid drive housing and extend completely around a transmission side periphery of the hybrid drive housing that is adapted to be enclosed by an outer housing of a transmission;
a plurality of mounting tabs, each of which are configured to be connected to a mounting surface on the hybrid drive housing;
a fluid pathway located on or in the baffle, a plurality of orifices extending from the fluid pathway that are configured to be oriented toward an electric motor of the hybrid drive assembly; and
a fluid inlet port located in one of the mounting tabs and connected to the fluid pathway.

14. The baffle of claim 13, wherein the baffle includes an internal cavity that forms the fluid pathway that extends at least about 120 degrees around the ring-shaped body.

15. The baffle of claim 14, wherein the baffle is formed of a polymeric material and the internal cavity is integrally formed in the baffle.

16. The baffle of claim 13, wherein the fluid pathway is formed by a tube affixed to the ring-shaped body, and the orifices are formed in the tube.

17. The baffle of claim 16, wherein the ring-shaped body includes clips that affix the tube to the baffle.

* * * * *